United States Patent
Bowyer et al.

(10) Patent No.: US 9,683,735 B2
(45) Date of Patent: Jun. 20, 2017

(54) SYSTEM AND DEVICE FOR SUPPORTING HORIZONTAL BOILER TUBES

(71) Applicant: BABCOCK & WILCOX POWER GENERATION GROUP, INC., Barberton, OH (US)

(72) Inventors: Michael P Bowyer, Copley, OH (US); Angela S Liberatore, Massillon, OH (US); Fernando B Sartori, Norton, OH (US)

(73) Assignee: The Babcock & Wilcox Company, Barberton, OH (US)

( * ) Notice: Subject to any disclaimer, the term of this patent is extended or adjusted under 35 U.S.C. 154(b) by 0 days.

(21) Appl. No.: 14/575,415

(22) Filed: Dec. 18, 2014

(65) Prior Publication Data

US 2016/0178192 A1    Jun. 23, 2016

(51) Int. Cl.
*F16L 3/02*      (2006.01)
*F22B 37/20*     (2006.01)
*F16L 3/223*     (2006.01)

(52) U.S. Cl.
CPC .............. *F22B 37/205* (2013.01); *F16L 3/02* (2013.01); *F16L 3/223* (2013.01)

(58) Field of Classification Search
CPC ...... F22B 37/205; F22B 37/204; F22B 37/20; F22B 37/203; F22B 37/242; F16L 3/02; F16L 3/2235; F16L 3/223; F16L 3/221
USPC .............. 248/49, 56, 65, 68.1; 122/510, 511
See application file for complete search history.

(56) References Cited

U.S. PATENT DOCUMENTS

| | | | | |
|---|---|---|---|---|
| 1,028,630 A | * | 6/1912 | Stryker | F16B 15/0015 248/68.1 |
| 1,356,040 A | * | 10/1920 | Caskey | F16L 3/14 248/58 |
| 1,542,267 A | * | 6/1925 | Parker | F16L 3/221 248/68.1 |
| 2,175,555 A | * | 10/1939 | Brown | C10G 9/20 122/510 |
| 2,517,411 A | * | 8/1950 | Patterson | F25B 39/02 165/133 |
| 3,404,858 A | * | 10/1968 | Levy | F16L 3/227 248/230.9 |
| 3,929,189 A | * | 12/1975 | Lecon | F22B 37/202 122/510 |
| 3,998,268 A | * | 12/1976 | Sagan | F28F 9/0132 122/510 |
| 4,184,862 A | * | 1/1980 | Waters | F28D 15/0275 165/162 |
| 4,421,975 A | * | 12/1983 | Stein | H05B 3/06 219/536 |
| 4,605,059 A | * | 8/1986 | Page | F28D 7/024 165/163 |

(Continued)

OTHER PUBLICATIONS https://web.archive.org/web/20120420163016/http://www.engineeringtoolbox.com/melting-temperature-metals-d_860.html. The Engineering Tool Box; Date; Apr. 20, 2012.*

*Primary Examiner* — Muhammad Ijaz
(74) *Attorney, Agent, or Firm* — Michael J. Seymour (57) ABSTRACT

A system for supporting horizontal boiler tubes comprises a support plate, a vertical stringer tube, and a shear lug. The shear lug attaches the support plate to the vertical stringer tube through a slot in the support plate. A plurality of supporting arms extend outwardly from the first and second sides perpendicular to a main body portion of the support plate. Each supporting arm includes a retaining lip extending upwardly from a distal end of the supporting arm and a rounded recess, the rounded recess and retaining lip defining a cradle within which a horizontal boiler tube may rest.

19 Claims, 7 Drawing Sheets

(56) References Cited

U.S. PATENT DOCUMENTS

| | | | | |
|---|---|---|---|---|
| 4,619,315 A * | 10/1986 | Waryasz | B01J 8/1836 | 122/4 D |
| 4,665,866 A * | 5/1987 | Wepfer | F22B 37/205 | 122/235.17 |
| 5,090,645 A * | 2/1992 | Zuercher | F16L 3/223 | 174/166 R |
| 5,123,618 A * | 6/1992 | Guterman | H02G 3/0456 | 248/49 |
| 5,136,985 A * | 8/1992 | Krowech | F28F 9/0132 | 122/510 |
| 5,730,399 A * | 3/1998 | Baginski | H02G 3/263 | 24/16 PB |
| 5,765,786 A * | 6/1998 | Gretz | H02G 3/26 | 248/68.1 |
| 5,836,130 A * | 11/1998 | Unruh | F16L 3/223 | 248/68.1 |
| 6,273,030 B1 * | 8/2001 | Harth, III | F22B 37/202 | 110/325 |
| 6,857,606 B1 * | 2/2005 | Gretz | F16L 3/223 | 248/68.1 |
| 6,916,279 B2 * | 7/2005 | Endelman | A63B 21/04 | 482/123 |
| 7,506,770 B2 * | 3/2009 | Rief | A47L 9/0009 | 211/70.6 |
| 7,896,296 B2 * | 3/2011 | Julian | F16L 3/127 | 248/547 |
| 2006/0243223 A1 * | 11/2006 | Retting | F22B 37/205 | 122/4 R |
| 2015/0184775 A1 * | 7/2015 | Koski | F16L 3/02 | 248/68.1 |

\* cited by examiner

SYSTEM AND DEVICE FOR SUPPORTING HORIZONTAL BOILER TUBES

BACKGROUND

The present disclosure relates to a system and device for supporting horizontal boiler tubes. The system comprises a support plate having supporting arms, a vertical stringer tube, and a shear lug.

In many boilers, water and/or steam flows back and forth through horizontally disposed tubes and is exposed to hot gases passing over the exterior of the tubes, causing the water and/or steam to be heated. The passes of the tubes must be supported as the water and/or steam within the tubes is heated.

The conventional method of supporting horizontally disposed tubes from vertical stringer tubes is to weld individual castings onto the stringer tubes and then support the horizontal tubes on these castings. Each casting typically has two welds to the stringer tube that are approximately two inches in length. The cost of manufacturing such a system is high, and the required time necessary is equally high. Such short welds in this method are inherently difficult and time consuming because, by the time a weld bead is developed, the weld is almost complete. This process of constantly starting and stopping welds is the most difficult and risky part of the welding operation. If the stringer tube is thin, there is increased risk of burn-through from the immense number of welds that can easily approach the hundreds of thousands on a single boiler. This results in a high cost of manufacturing and requires long time periods to complete.

It would be desirable to provide a system and device for supporting the boiler tubes, particularly a system capable of withstanding changes in tube length as the tubes expand and contract due to temperature changes encountered during boiler operation, that has reduced costs and manufacturing time.

BRIEF DESCRIPTION

The present application discloses a system and device for supporting horizontal boiler tubes. The system comprises a support plate having supporting arms, a vertical stringer tube, and a shear lug. The shear lug attaches the support plate to the vertical stringer tube.

The support plate has a front face, a rear face, a first side, a second side, a top edge, a bottom edge, and a main body portion. The first and second sides of the support plate are located on opposite sides of the main body portion. The support plate has a slot in the main body portion that passes from the front face to the rear face. The support plate further has a plurality of supporting arms extending outwardly from the first and second sides. The supporting arms extend perpendicular to the main body portion of the support plate. Each supporting arm includes a retaining lip extending upwardly from a distal end of the supporting arm.

In some particular embodiments, each supporting arm extending from the first side has a corresponding supporting arm extending from the second side in the same longitudinal level and parallel to the supporting arm extending from the first side. In other alternative embodiments, the supporting arms on the first side are staggered from the supporting arms on the second side, such that the elevations of the supporting arms alternate between the two sides.

Disclosed in various embodiments herein are support plates for supporting horizontal boiler tubes, comprising: a front face, a rear face, a first side, a second side opposite the first side, a top edge, a bottom edge, and a main body portion; a slot in the main body portion that passes from the front face to the rear face; a plurality of supporting arms extending outwardly from the first and second sides and perpendicular to the main body portion, and wherein each supporting arm includes a retaining lip at a distal end of the supporting arm.

In particular embodiments, each supporting arm extending from the first side has a corresponding supporting arm extending from the second side in the same longitudinal level and parallel to the supporting arm extending from the first side.

The retaining lip generally extends upwardly from the distal end of the supporting arm. In particular embodiments, the retaining lip extends upwardly from the distal end of the supporting arm to a height that is equal to the radius of the associated horizontal boiler tube.

Each supporting arm may further comprise a rounded recess within which an associated horizontal boiler tube may rest. In additional embodiments, each supporting arm has a plurality of rounded recesses, such that multiple rows of associated horizontal boiler tubes may be supported on each supporting arm.

The front face and the rear face of the support plate may be flat and parallel to one another. The main body portion is generally solid, such that no hollow interior is present between the front and rear faces. The support plate may be reflectionally symmetrical about a plane of symmetry. The support plate may have a plurality of longitudinal levels of supporting arms.

Also disclosed are systems for supporting horizontal boiler tubes, the system comprising: a support plate for supporting associated horizontal boiler tubes having a front face, a rear face, a first side, a second side opposite the first side, a top edge, a bottom edge, and a main body portion, the main body portion having a slot that passes from the front face to the rear face of the support plate; a plurality of supporting arms extending outwardly from the first and second sides and perpendicular to the main body portion of the support plate, wherein each supporting arm extending from the first side has a corresponding supporting arm extending from the second side in the same longitudinal level and parallel to the supporting arm extending from the first side, wherein each supporting arm includes a retaining lip at a distal end of the supporting arm; a vertical stringer tube; and a shear lug for attaching the support plate to the vertical stringer tube.

The shear lug passes through the slot in the support plate and attaches to the vertical stringer tube, such that the support plate rests on the shear lug, i.e. the support plate is not welded to the shear lug or the vertical stringer tube. The shear lug can be welded to the vertical stringer tube.

These and other non-limiting characteristics and advantages of the disclosure are more particularly disclosed below.

BRIEF DESCRIPTION OF THE DRAWINGS

The following is a brief description of the drawings, which are presented for the purposes of illustrating the exemplary embodiments disclosed herein and not for the purposes of limiting the same.

DETAILED DESCRIPTION

A more complete understanding of the components, processes and apparatuses disclosed herein can be obtained by reference to the accompanying drawings. These figures are merely schematic representations based on convenience and the ease of demonstrating the present disclosure, and are, therefore, not intended to indicate relative size and dimensions of the devices or components thereof and/or to define or limit the scope of the exemplary embodiments.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to components of like function.

The singular forms "a," "an," and "the" include plural referents unless the context clearly dictates otherwise.

As used in the specification, various devices and parts may be described as "comprising" other components. The terms "comprise(s)," "include(s)," "having," "has," "can," "contain(s)," and variants thereof, as used herein, are intended to be open-ended transitional phrases, terms, or words that do not preclude the possibility of additional components. However, such description should be construed as also describing the devices and parts as "consisting of" and "consisting essentially of" the enumerated components, and excluding other components.

Numerical values should be understood to include numerical values which are the same when reduced to the same number of significant figures and numerical values which differ from the stated value by less than the experimental error of the conventional measurement technique used to determine the value.

As used herein, approximating language may be applied to modify any quantitative representation that may vary without resulting in a change in the basic function to which it is related. Accordingly, a value modified by a term or terms, such as "about" and "substantially," may not be limited to the precise value specified, in some cases. The modifier "about" should also be considered as disclosing the range defined by the absolute values of the two endpoints. For example, the expression "from about 2 to about 4" also discloses the range "from 2 to 4."

Some of the terms used herein are relative terms. For example, the terms "front" and "rear" and "forward" and "rearward" are relative to a center, with the front being located opposite to the rear and an element that extends "forward" always extends away from the center in a direction opposite an element that extends "rearward." The terms "top" and "bottom" and "upward" and "downward" are relative to an absolute reference, i.e. the surface of the earth. Put another way, a top location is always located at a higher elevation than a bottom location, and an element that extends "upward" always extends away from the surface of the earth, opposite an element that extends "downward" toward the surface of the earth.

The term "longitudinal" indicates a direction that is parallel with the surface of the earth. As used herein, the front and rear are located along an x-axis, the left and right are located along a y-axis, and the top and bottom are located along a z-axis, wherein the three axes are perpendicular to each other. The terms "plane" and "level" are used herein to refer generally to a common level, and should be construed as referring to a volume, not as a flat surface. In this way, two elements that are located in the same longitudinal level are parallel with one another and are present in the same common volume and may extend in opposing directions within that common level.

The terms "horizontal" and "vertical" are used to indicate direction relative to an absolute reference, i.e. ground level. However, these terms should not be construed to require structures to be absolutely parallel or absolutely perpendicular to each other.

The term "parallel" should be construed in its lay term as two edges or faces generally continuously having the same distance between them, and should not be strictly construed in mathematical terms as requiring that the two edges or faces cannot intersect when extended for an infinite distance. Similarly, the term "perpendicular" should not be construed as requiring that two faces meet at an angle of absolutely 90°.

The term "substantially", as used herein refers to a variance of plus/minus 5% (±5%) when used in conjunction with a numerical value.

To the extent that explanations of certain terminology or principles of the system and device for supporting horizontal boiler tubes, and boiler, furnace, and/or steam generator arts may be necessary to understand the present disclosure, the reader is referred to *Steam/its generation and use,* 41st Edition, Kitto and Stultz, Eds., Copyright 2005, The Babcock & Wilcox Company, the text of which is hereby incorporated by reference as though fully set forth herein.

The present disclosure relates to a system and device for supporting horizontal boiler tubes, where the system comprises a support plate having supporting arms, a vertical stringer tube, and a shear lug. This permits horizontal boiler tubes to be supported with much less welding than current designs. The systems described herein can be used in combination with any boiler system, e.g. power generation systems having horizontal boiler tubes. It is further contemplated that the present system and device can be used wherever it is desirable to support horizontal tubes, pipes, or the like, in any boiler, furnace, and/or steam generator component and system or the like. The present system and device addresses the shortcomings of prior systems.

Figure 1:
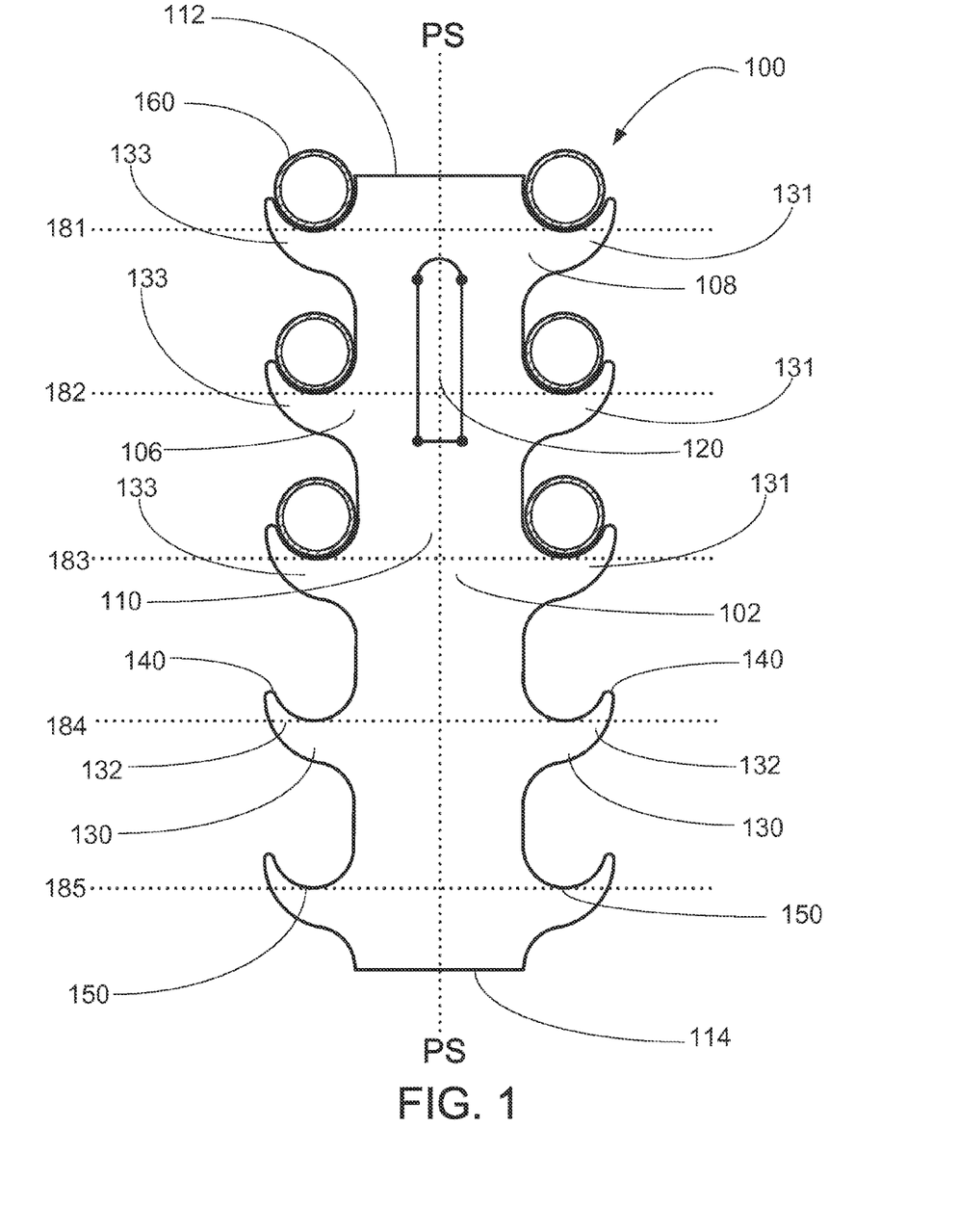
FIG. 1 is a front view of a first exemplary support plate according to the present disclosure. Here, supporting arms on opposite sides of the plate are parallel to each other, or at the same elevation.
Figure 2:
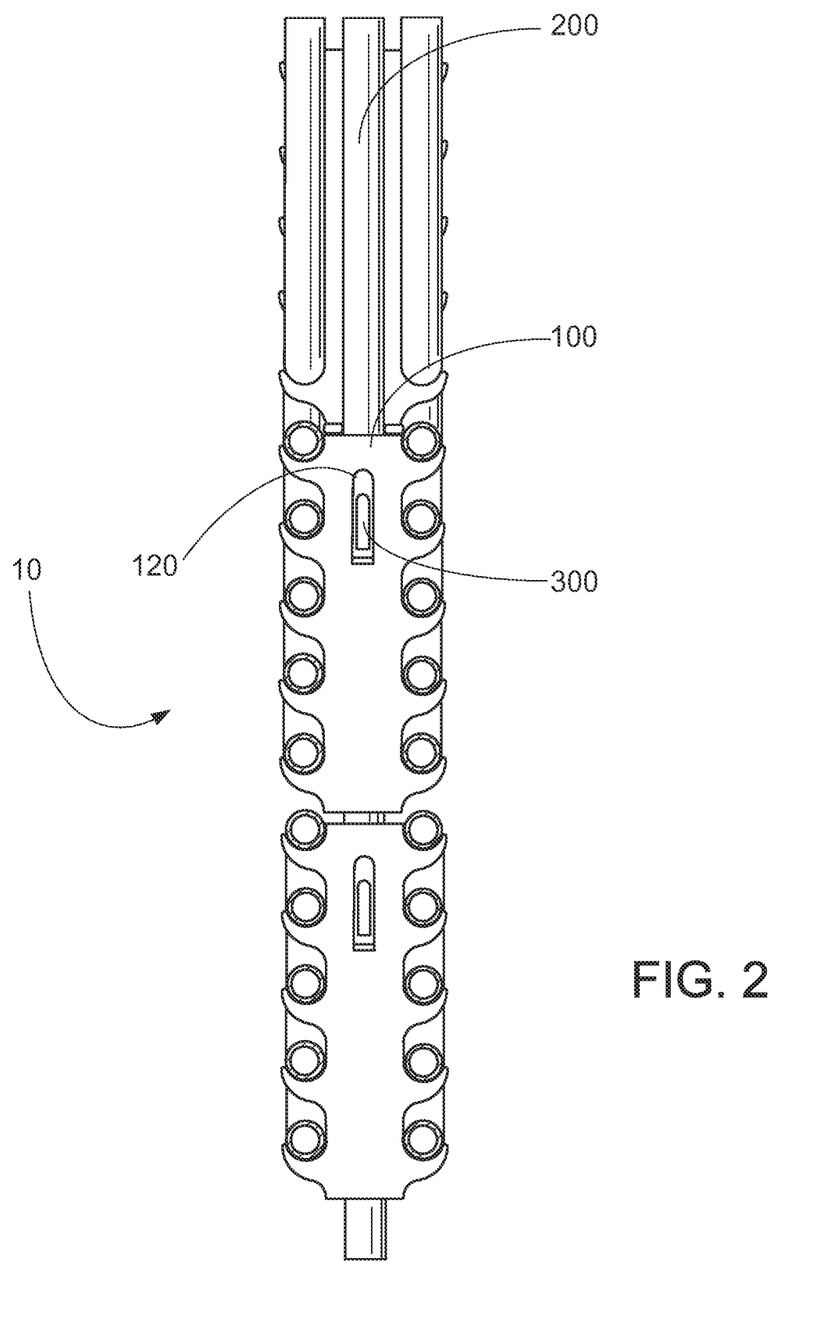
FIG. 2 is a front view of the first support plate of FIG. 1 in a support system including vertical stringer tubes, a shear lug, and horizontal boiler tubes.
Figure 3:
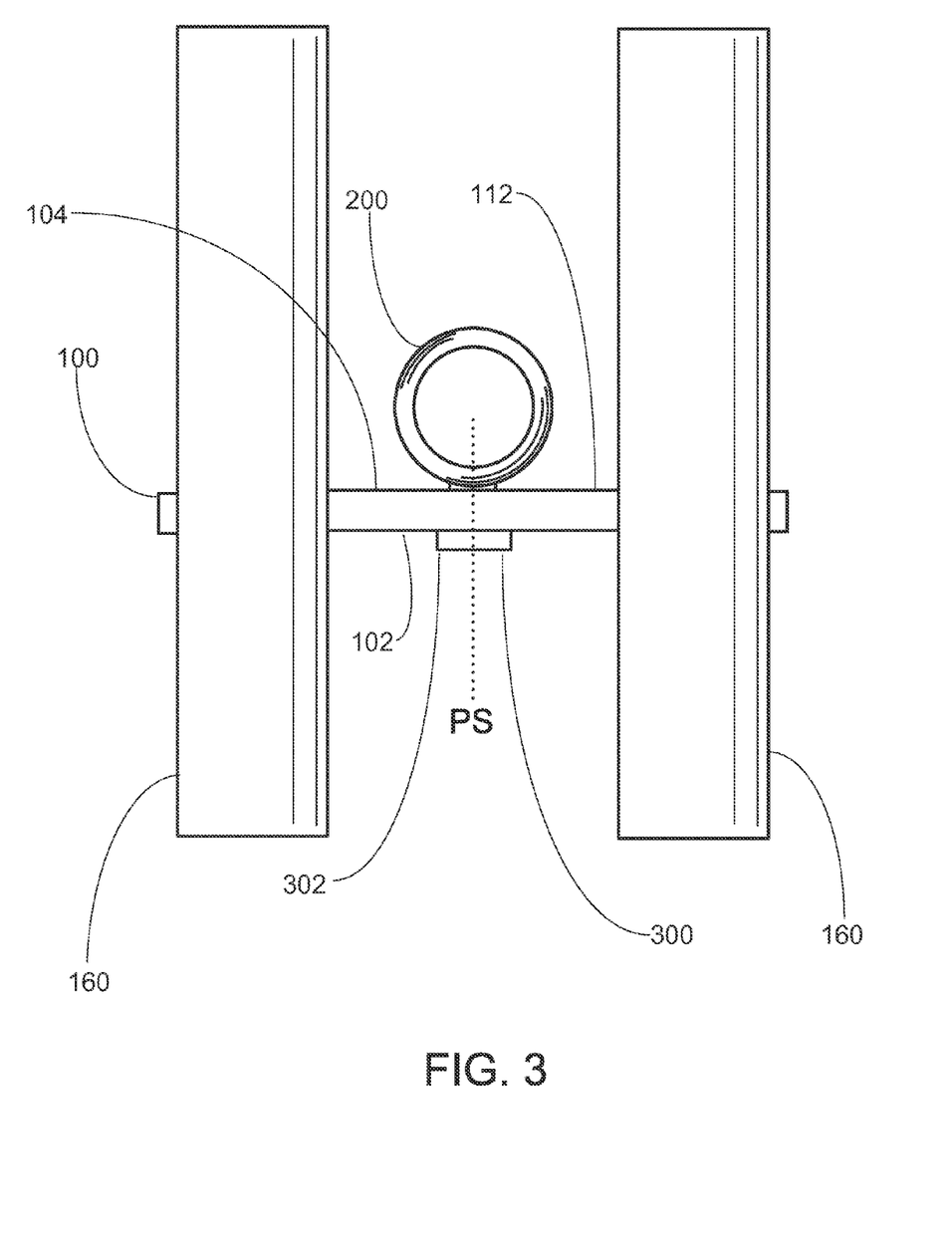
FIG. 3 is a plan view of the system of FIG. 2.

Referring to FIGS. 1-3, a first exemplary embodiment of a support plate is shown. FIG. 1 is a front view, FIG. 2 shows the support plate being used with horizontal boiler tubes, and FIG. 3 is a plan (top) view.

The support plate 100 has a front face 102, a rear face 104, a first side 106, a second side 108, a top edge 112, a bottom edge 114 and a main body portion 110. The first side 106 and the second side 108 are located on opposite sides of the support plate 100. Put another way, the main body portion 110 separates the first side 106 and the second side 108.

The main body portion 110 of the support plate 100 is generally solid. Put another way, no hollow interior is present between the front face 102 and the rear face 104 of the support plate 100. The front face 102 and the rear face 104 of the support plate 100 are generally flat and parallel to one another. Put another way, the support plate 100 generally has a constant thickness from the front face 102 to the rear face 104 along the length of the support plate 100 from the top edge 112 to the bottom edge 114 of the support plate 100. There is no surface or protrusion extending outwards from the front face 102 or the rear face 104 along the bottom edge 114.

The main body portion 110 has a slot 120. The slot 120 passes from the front face 102 to the rear face 104 of the support plate 100. Put another way, the slot 120 passes all the way through the support plate 100. The slot 120 may be of any desirable size and shape, but is generally large enough to permit an associated shear lug to pass through the slot 120 for attaching the support plate 100 to an associated stringer tube.

The support plate 100 has a plurality of supporting arms 130. The supporting arms 130 serve to support associated horizontal boiler tubes 160 on the support plate 100. The supporting arms 130 extend from the first and second sides 106, 108 of the support plate 100 perpendicular to the main body portion 110. Each supporting arm 130 extending from the first side 106 corresponds to a supporting arm 130 extending from the second side 108 in the same longitudinal level. Put another way, corresponding supporting arms extend parallel to one another from opposing sides of the support plate 100 in the same longitudinal level.

For example, as shown in FIG. 1, the support plate 100 has five supporting arms 133 extending from the first side 106 of the support plate, each supporting arm 133 having a corresponding supporting arm 131 extending from the second side 108 of the support plate 100. In FIG. 1, the arms are arranged at five longitudinal levels 181, 182, 183, 184, 185 of supporting arms 130, each longitudinal level having at least one pair of corresponding supporting arms 130. The spacing between longitudinal levels is constant. In this particular embodiment, the support plate 100 is reflectionally symmetrical about a plane of symmetry PS (See FIG. 1 and FIG. 3).

The supporting arms 130 may be of any desirable size and shape for supporting associated horizontal boiler tubes 160 thereon. For example, it may be desirable to make the supporting arms 130 extend from the support plate 100 a distance larger than the diameter of associated horizontal boiler tubes (measured at room temperature), such that the tubes are capable of expanding and contracting under various temperatures while remaining fully supported by the supporting arms 130.

Each supporting arm 130 includes a retaining lip 140 extending upwardly from a distal end 132 of the supporting arm 130. In this way, the retaining lip 140 serves to hold an associated horizontal tube 160 on the supporting arm 130 and prevent the tube from becoming dislodged from the supporting arm 130. Generally, the retaining lips 140 of the supporting arms 130 extend upwardly from the distal ends 132 of the supporting arms 130, in the direction of the top edge 112 of the support plate 100. The retaining lip 140 may be of any suitable shape and may extend from the distal end 132 of the supporting arm 130 for any desired distance. The retaining lip 140 generally extends from the supporting arm 130 to a height that is sufficient to prevent an associated horizontal boiler tube from becoming dislodged from the supporting arm 130. For example, it is generally sufficient that the retaining lip 140 extend upwardly from the distal end 132 of the supporting arm 130 to a height that is equal to the radius of the associated horizontal boiler tube.

Each supporting arm 130 may also include a rounded recess 150. When the supporting arm 130 has a rounded recess 150, the rounded recess 150 and the retaining lip 140 define a cradle within which a horizontal boiler tube may rest. The rounded recess 150 may be any desirable size, but is generally at least as large as the diameter of an associated horizontal boiler tube (measured at room temperature). It may further be desirable to ensure that the rounded recess 150 is larger than the diameter of the associated horizontal boiler tube, such that the associated horizontal boiler tube remains seated within the rounded recess 150 when expanding upon being heated.

The support plate 100 may be made of any suitable material. The support plate 100 should generally be made of a material that is durable and capable of withstanding the typically high temperatures of a boiler, which can customarily be between 0° and 2000° Fahrenheit. For example, suitable materials from which the support plate 100 may be made include, but are not limited to, carbon steel, alloy steel, stainless steel, Inconel alloys, plastics, polymers, or fiberglass. Generally, it is understood that the only limitation on the material chosen is that the material must be capable of withstanding the high temperatures of a furnace boiler. The support plate 100 may be made by any suitable process. For example, suitable processes for making the support plate 100 include, but are not limited to, laser or water cutting, casting, forging, stamping, or wire or saw cutting.

Turning now to FIG. 2, an exemplary embodiment of a system for supporting horizontal boiler tubes is shown. The system 10 comprises a support plate 100, a vertical stringer tube 200, and a shear lug 300. The shear lug 300 passes through the slot 120 in the support plate 100 and attaches to the vertical stringer tube 200. The support plate 100 rests on the shear lug 300, as shown in FIG. 2, and the shear lug can include a lip (not visible) to keep the support plate from falling off. The shear lug and the support plate are generally not welded together. The shear lug 300 is generally welded to the vertical stringer tube 200, but any other suitable method of attaching the shear lug 300 to the vertical stringer tube 200 may be used. Multiple shear lugs 300 may be attached to a single vertical stringer tube 200, such that multiple support plates 100 can be supported thereon, such as is shown in FIG. 2.

Referring now to FIG. 3, a plan view of the system 10 is shown. As described above, the slot in the main body portion of the support plate 100 passes from the front face 102 to the rear face 104. In this way, the shear lug 300 attaches the support plate 100 to the vertical stringer tube 200. The lip 302 of the shear lug can be visualized here. The tubes 160 in the uppermost level of supporting arms are also visible, as is the top edge 112 of the support plate.

Figure 4:
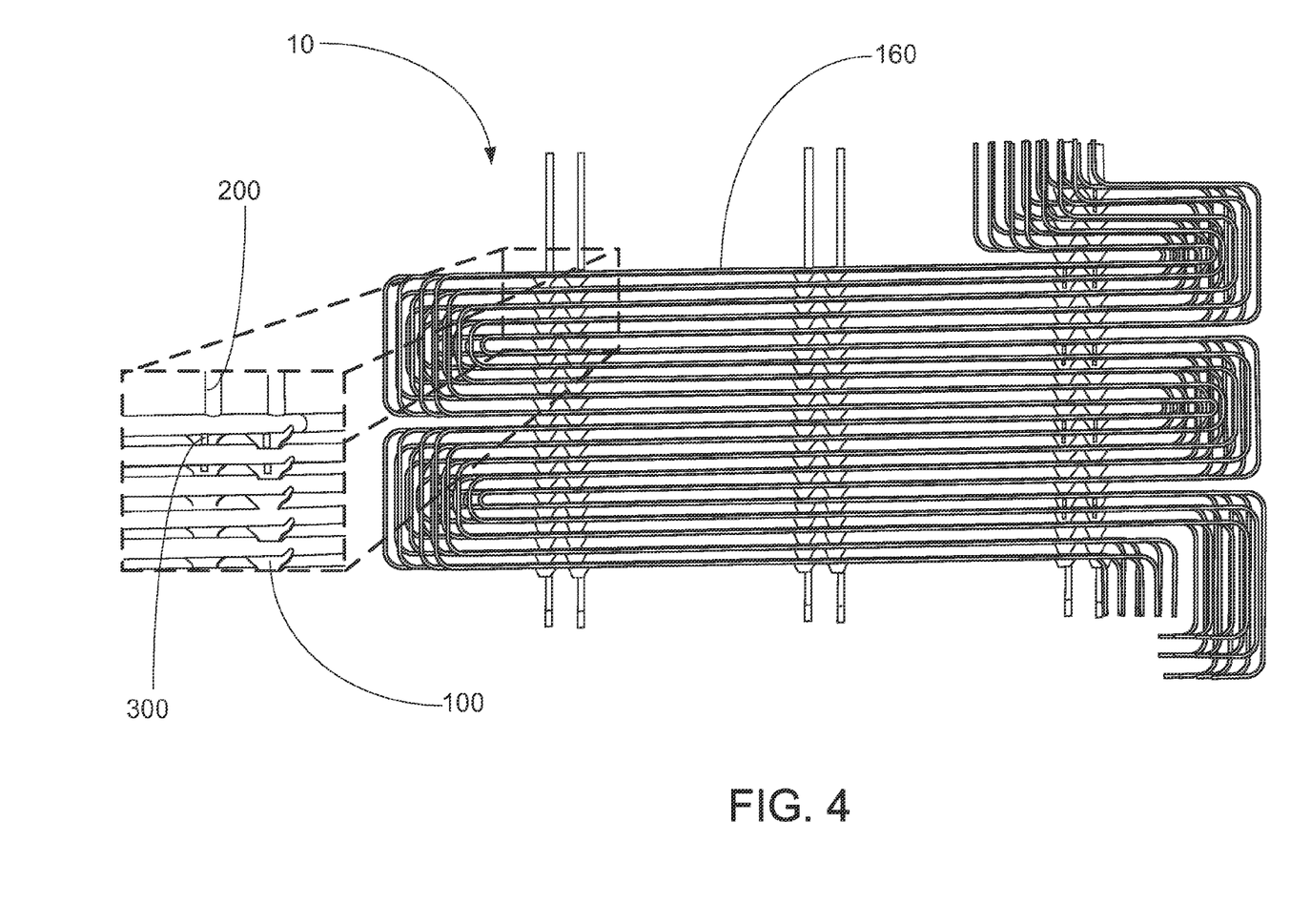
FIG. 4 is an isometric view of the system of FIG. 2 with an enlarged view of one section of the system.

An isometric view of system 10 can be seen in FIG. 4, which includes an expanded view of one section of the system. In this expanded view, the shear lug 300 attaches the support plate 100 to a vertical stringer tube 200 and associated horizontal boiler tubes are supported on the support plate 100. The isometric view shows a total of six vertical stringer tubes 200. Four of the vertical stringer tubes have four support plates attached thereto, while the two vertical stringer tubes on the right of the figure have five support plates attached thereto. As seen here, the boiler tubes 160 loop back and forth, with each loop being supported within the arms of a support plate.

Figure 5:
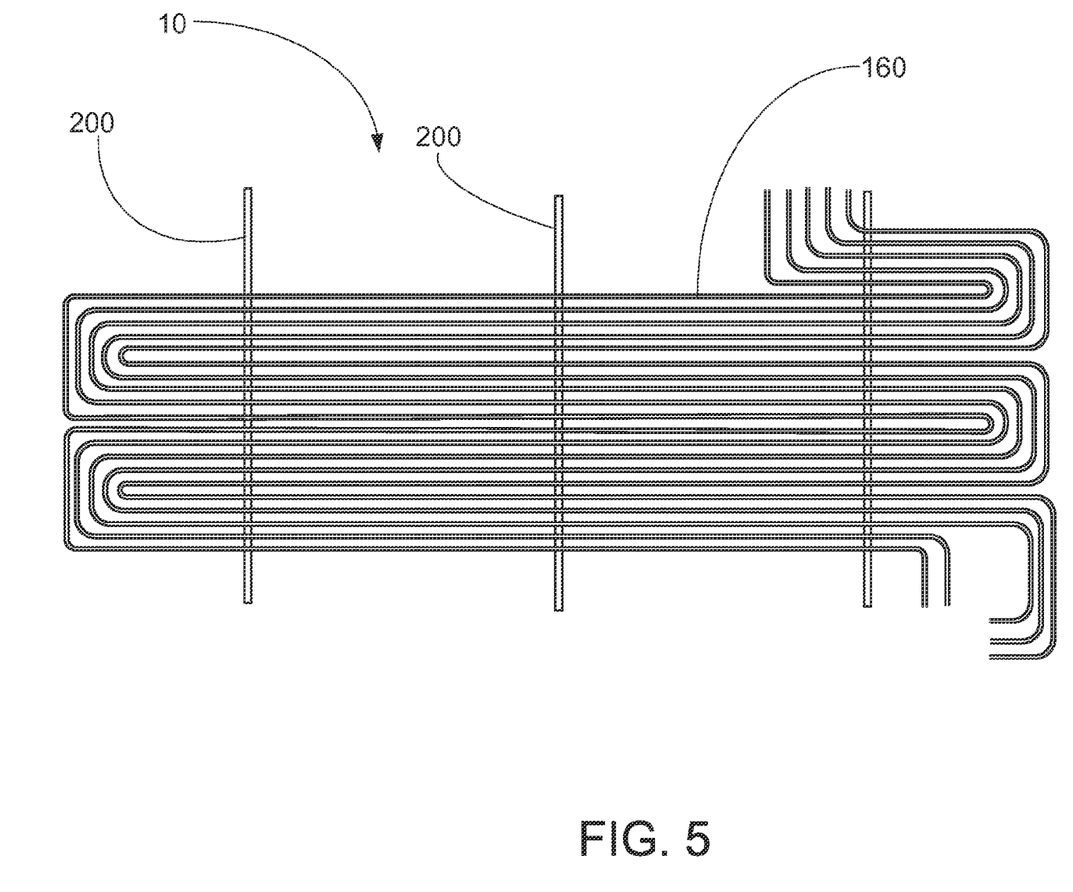
FIG. 5 is a side view of the system of FIG. 2.

Turning now to FIG. 5, a side view of the system 10 is shown. The vertical stringer tubes 200 and the boiler tubes 160 are much more visible.

Figure 6:
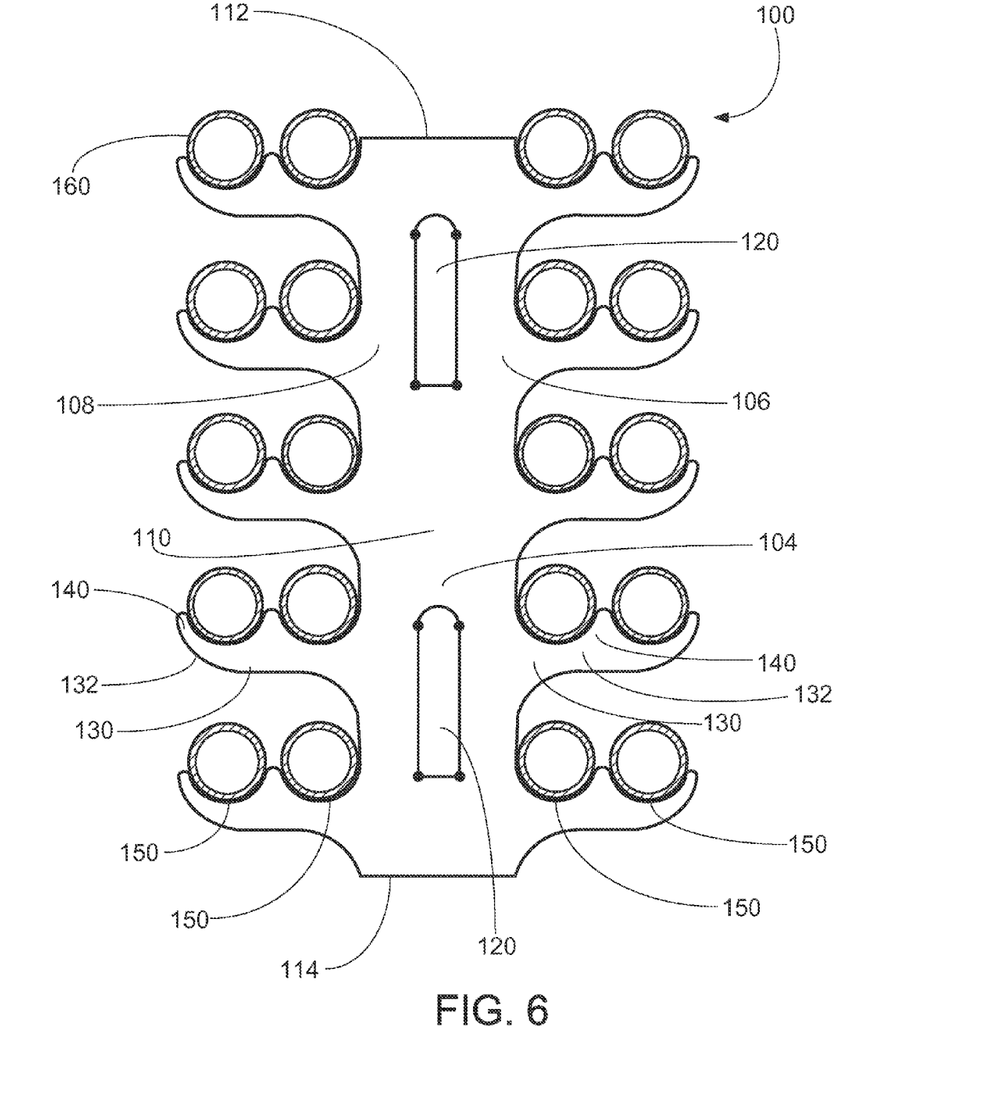
FIG. 6 is a front view of a second exemplary embodiment of the support plate, having additional features.

FIG. 6 illustrates additional features that can be present in the support plates of the present disclosure, and can be contrasted with FIG. 1.

The support plate 100 here is shown having a plurality of longitudinal levels of supporting arms. However, each supporting arm 130 has a plurality of rounded recesses 150. Multiple rows of associated horizontal boiler tubes may thus be held by each supporting arm 130. The supporting arms 130 of the support plate 100 of FIG. 6 are shown as having two rounded recesses 150 per supporting arm 130, but it is contemplated that as many rounded recesses 150 as desirable can be provided in each supporting arm 130.

As more rounded recesses 150 are provided in each supporting arm 130, the total number of associated horizontal boiler tubes capable of being supported by a single support plate 100 increases, and the load supported by each support plate 100 thereby increases as well. As such, it may be desirable to provide more than one slot 120 in the support plate 100. The support plate of FIG. 6 is illustrated with two slots 120. This permits the use of additional shear lugs with a single support plate, which can increase the stability of the support plate and reduce the load carried by each shear lug.

Figure 7:
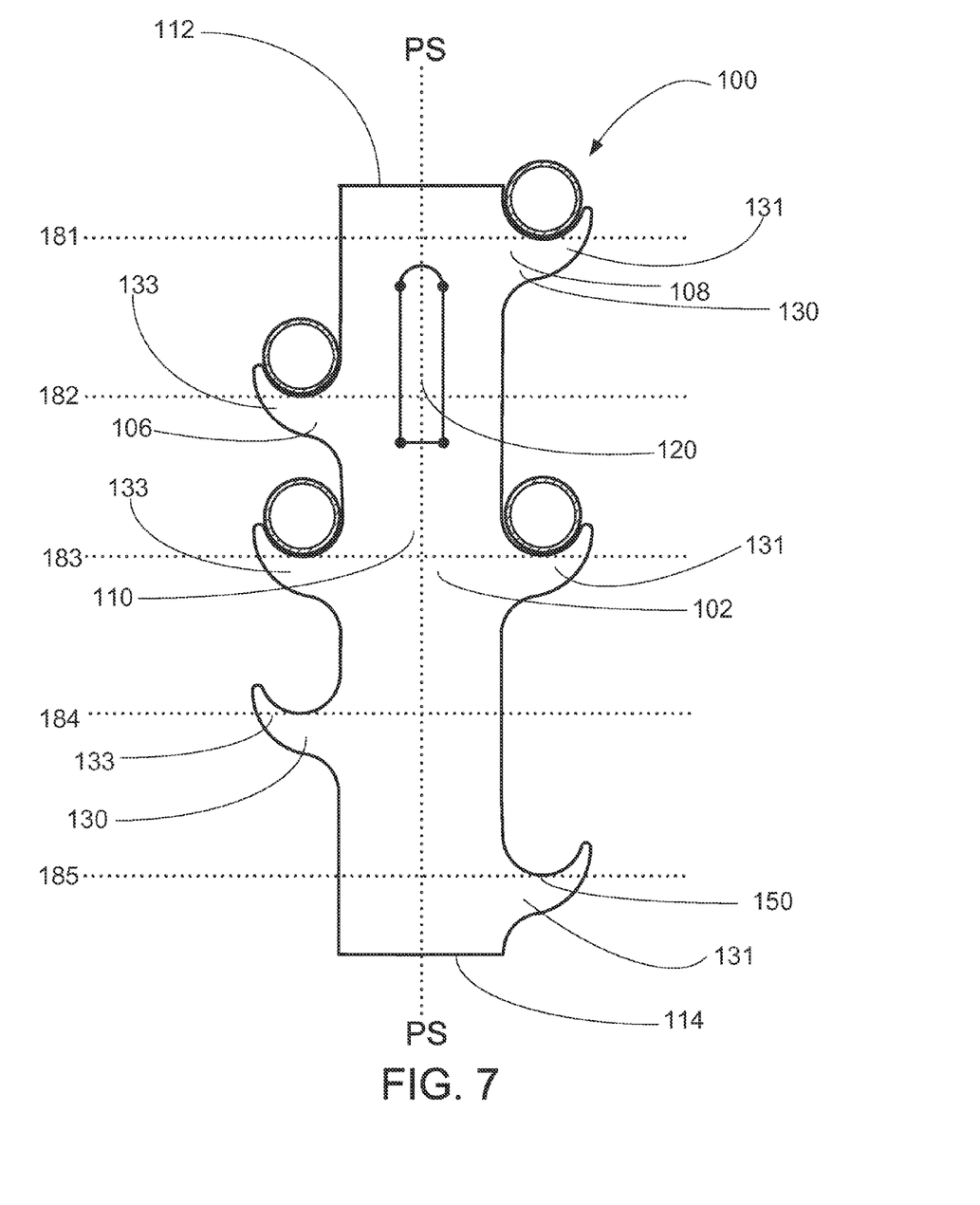
FIG. 7 is a front view of a third exemplary embodiment of the support plate. Here, supporting arms on opposite sides of the plate are staggered relative to each other, or in other words at alternating elevations.

FIG. 7 is a third exemplary embodiment of the support plate. This embodiment also has a front face 102, a rear face (not visible), a first side 106, a second side 108, a top edge 112, a bottom edge 114 a main body portion 110, a slot 120, and a plurality of supporting arms 130 as previously described.

In FIG. 7, the supporting arms 130 extend from the first side 106 and the second side 108 in an alternating, staggered manner. Put another way, the elevation of the supporting arms 130 alternates between the two sides, and there is only one supporting arm at a given longitudinal level. As illustrated here, there is a supporting arm 131 extending from the second side 108 at longitudinal levels 181, 183, and 185, and no supporting arm extending from the first side 106 at longitudinal levels 181 and 185. Similarly there is a supporting arm 133 extending from the first side 106 at longitudinal levels 182 and 184, and no supporting arm extending from the second side 108 at these two longitudinal levels. The distance between the longitudinal levels 181, 183, and 185 is generally the same as the distance between the longitudinal levels 182 and 184.

This novel and useful system and device for supporting horizontal boiler tubes is particularly advantageous. For example, the presently disclosed system improves greatly upon existing support systems by reducing the number of welds necessary, thus allowing for shorter manufacturing schedules with less cost and less risk. The use of the shear lug for holding the support plate minimizes the amount of welds to one or two welds to attach the shear lug to the stringer tube. These welds are longer than the welds used in the existing method and have a lower number of starts and stops, thus reducing the risk of weld defects. Further, the reduction in the number of support pieces, from many individual castings to a single support plate and shear lug, reduces the number of parts that must be manufactured, handled, shipped, and sourced.

The present disclosure overcomes the aforementioned disadvantages with a cost-effective, easy-to-use system and device for supporting horizontally disposed tubes that is capable of being easily adapted for use in furnaces, boilers, steam generators, and the like and is further capable of withstanding the expanding and contracting of the tubes. It is more specifically contemplated that this system can be used in the economizer section or in a convection pass. The presently disclosed support system can be easily adapted to meet the needs of any project. As such, there is no inherent limit on the length of the support plate or the number of tubes that a single support plate can support.

The present system can be quickly and easily installed by passing the shear lug through a slot in the support plate, thereby attaching the shear lug to the vertical stringer tube. The support plate is thereby supported by the shear lug and horizontal boiler tubes may be installed and are supported by the supporting arms of the support plate.

Other benefits of the system and support plate described herein relate to production. For example, the overall length of the support plate can be easily increased by simply adding more longitudinal levels of supporting arms, without any other cost in materials. Similarly, each longitudinal level of supporting arm can have a plurality or rounded recesses for supporting multiple tubes at each level. Furthermore, a single vertical stringer tube can be used with multiple support plates to provide desired configurations. The support plate can also be reduced in thickness, thus reducing waste.

While various aspects and embodiments have been disclosed herein, other aspects, embodiments, modifications, variations, alterations, and substantial equivalents will be apparent to those skilled in the art upon reading and understanding the preceding detailed description, which are or may be presently unforeseen. The various aspects and embodiments disclosed herein are for purposes of illustration and are not intended to be limiting. It is intended that the present disclosure be construed as including all such aspects, embodiments, modifications, variations, alterations, and substantial equivalents insofar as they come within the scope of the appended claims or the equivalents thereof.

The invention claimed is:

1. A support plate for supporting associated horizontal boiler tubes, the support plate comprising:
   a front face, a rear face, a first side, a second side opposite the first side, a top edge, and a bottom edge;
   a main body portion that is solid, such that no hollow interior is present between the front and rear faces except for a slot in the main body portion that passes from the front face to the rear face, the slot configured to permit an associated shear lug to pass through the slot for attaching the support plate to an associated vertical stringer tube;
   one or more supporting arms extending outwardly from the first side perpendicular to the main body portion; and one or more supporting arms extending outwardly from the second side perpendicular to the main body portion;
   wherein the one or more supporting arms extending outwardly from the first side and the one or more supporting arms extending outwardly from the second side include an outer retaining lip at a distal end of the supporting arm and a plurality of rounded recesses, each rounded recess being spaced apart from adjacent rounded recesses by an inner retaining lip extending therebetween, such that multiple rows of the associated horizontal boiler tubes may be supported on each supporting arm within the plurality of rounded recesses;
   a vertical stringer tube; and
   a shear lug that passes through the slot in the support plate and attaches the support plate to the vertical stringer tube, the shear lug including a lip configured to prevent the support plate from falling off of the shear lug wherein the shear lug is welded to the stringer tube; and
wherein the support plate is made of a material that is capable of withstanding temperatures from about 0° to about 20000 F.

2. The support plate of claim 1, wherein every supporting arm of the one or more supporting arms extending outwardly from the first side corresponds to a respective supporting arm of the one or more supporting arms extending outwardly from the second side to define a pair of corresponding supporting arms that are positioned in a same longitudinal level and parallel to one another.

3. The support plate of claim 1, wherein every supporting arm of the one or more supporting arms extending outwardly from the first side is at a different longitudinal level than every supporting arm of the one or more supporting arms extending outwardly from the second side.

4. The support plate of claim 1, wherein the front face and the rear face are flat and parallel to one another.

5. The support plate of claim 1, wherein the support plate is reflectionally symmetrical about a plane of symmetry.

6. The support plate of claim 1, wherein the one or more supporting arms extending outwardly from the first side and the one or more supporting arms extending outwardly from the second side are positioned at a plurality of longitudinal levels of the support plate.

7. The support plate of claim 1, wherein the outer retaining lip of each supporting arm extends upwardly from the distal end thereof to a first height, and the inner retaining lip of each supporting arm extends upwardly between adjacent rounded recesses of the supporting arm to a second height that is equal to the first height.

8. A system for supporting associated horizontal boiler tubes, the system comprising:
a support plate for supporting the associated horizontal boiler tubes, the support plate having a front face, a rear face, a first side, a second side opposite the first side, a top edge, a bottom edge, and a main body portion, the main body portion having a slot that passes from the front face to the rear face of the support plate;
a plurality of supporting arms extending outwardly from the first and second sides and perpendicular to the main body portion of the support plate, wherein each supporting arm of the plurality of supporting arms includes an outer retaining lip extending upwardly from a distal end of the supporting arm;
a vertical stringer tube; and
a shear lug that passes through the slot in the support plate and attaches the support plate to the vertical stringer tube, the shear lug including a lip configured to prevent the support plate from falling off of the shear lug
wherein the shear lug is welded to the stringer tube.

9. The system of claim 8, wherein the shear lug is welded to the vertical stringer tube.

10. The system of claim 8, wherein each supporting arm of the plurality of supporting arms extending from the first side corresponds to a respective supporting arm of the plurality of supporting arms extending from the second side to define a pair of corresponding supporting arms that are positioned in a same longitudinal level of the support plate and parallel to one another.

11. The system of claim 8, wherein each supporting of the plurality of supporting arms extending from the first side is at a different longitudinal level of the support plate than supporting arm of the plurality of supporting arms extending from the second side; wherein each supporting arm extending from the second side is parallel to the respective supporting arm extending from the first side.

12. The system of claim 8, wherein each supporting arm further comprises a rounded recess within which the associated horizontal boiler tube can rest.

13. The system of claim 8, wherein each supporting arm has a plurality of rounded recesses, each of the plurality of rounded recesses spaced apart from adjacent rounded recesses by an inner retaining lip extending therebetween, such that multiple rows of associated horizontal boiler tubes may be supported on each supporting arm within the plurality of rounded recesses.

14. The system of claim 13, wherein the outer retaining lip of each supporting arm extends upwardly from the distal end thereof to a first height, and the inner retaining lip of each supporting arm extends upwardly between adjacent rounded recesses of the supporting arm to a second height that is equal to the first height.

15. The system of claim 8, wherein the front face and the rear face of the support plate are flat and are parallel to one another.

16. The system of claim 8, wherein the main body portion is solid, such that no hollow interior is defined between the front and rear faces of the support plate except for the slot in the main body portion.

17. The system of claim 8, wherein the support plate is reflectionally symmetrical about a plane of symmetry.

18. The system of claim 8, wherein the plurality of supporting arms extending outwardly from the first and second sides of the support plate are positioned at a plurality of longitudinal levels of the support plate.

19. The system of claim 8, wherein the support plate is made of a material that is capable of withstanding temperatures from about 0° to about 2000° F.

* * * * *